(12) United States Patent
Ludin et al.

(10) Patent No.: US 7,198,691 B2
(45) Date of Patent: *Apr. 3, 2007

(54) FASTENERLESS INTERNAL SUPPORT FOR HOLLOW STRUCTURES

(75) Inventors: Douglas R Ludin, Glen Mills, PA (US); Pierre J Minguet, Wallingford, PA (US)

(73) Assignee: The Boeing Company, Chicago, IL (US)

( * ) Notice: Subject to any disclaimer, the term of this patent is extended or adjusted under 35 U.S.C. 154(b) by 241 days.

This patent is subject to a terminal disclaimer.

(21) Appl. No.: 10/788,140

(22) Filed: Feb. 26, 2004

(65) Prior Publication Data

US 2004/0182967 A1    Sep. 23, 2004

Related U.S. Application Data

(63) Continuation of application No. 09/738,703, filed on Dec. 15, 2000, now Pat. No. 6,719,870.

(51) Int. Cl.
*B29C 65/00* (2006.01)
*B64C 3/14* (2006.01)
*B64C 3/18* (2006.01)

(52) U.S. Cl. ............... 156/293; 244/123.1; 244/123.8; 244/123.9; 244/131; 244/133

(58) Field of Classification Search ............... None
See application file for complete search history.

(56) References Cited

U.S. PATENT DOCUMENTS

| 3,519,228 | A | * | 7/1970 | Windecker ............... 244/123.5 |
| 4,492,607 | A |   | 1/1985 | Halcomb |
| 4,556,591 | A | * | 12/1985 | Bannink, Jr. ................. 428/43 |
| 4,624,599 | A |   | 11/1986 | Piasecki |
| 5,076,873 | A |   | 12/1991 | Lowery |
| 5,190,773 | A |   | 3/1993 | Damon |
| 5,354,195 | A |   | 10/1994 | Dublinski et al. |
| 5,527,414 | A |   | 6/1996 | Dublinski et al. |
| 5,580,502 | A |   | 12/1996 | Forster et al. |
| 5,744,284 | A |   | 4/1998 | Laub et al. |
| 5,847,375 | A | * | 12/1998 | Matsen et al. .............. 219/635 |
| 5,934,618 | A |   | 8/1999 | Kari et al. |
| 6,007,894 | A |   | 12/1999 | Barnes et al. |
| 6,237,304 | B1 |  | 5/2001 | Wycech |

* cited by examiner

*Primary Examiner*—Justin R. Fischer
(74) *Attorney, Agent, or Firm*—Harness, Dickey & Pierce, P.L.C.

(57) ABSTRACT

A reinforced structural member having a tubular member and a support structure. The tubular member has a sidewall that defines a hollow interior portion. The support structure is formed from a composite material and bonded to the sidewall in at least two predetermined locations. The support structure is positioned within the tubular member and configured to transmit force between the predetermined locations so as to prevent the tubular member from being crushed in response to the application of a force of a predetermined magnitude to the tubular member. A method for forming a reinforced structural member is also provided.

26 Claims, 3 Drawing Sheets

FASTENERLESS INTERNAL SUPPORT FOR HOLLOW STRUCTURES

CROSS-REFERENCE TO RELATED APPLICATIONS

This application is a continuation of U.S. patent application Ser. No. 09/738,703 filed on Dec. 15, 2000 and issued as U.S. Pat. No. 6,719,870 on Apr. 13, 2004. The disclosure of the above patent is incorporated herein by reference.

STATEMENT REGARDING FEDERALLY SPONSORED RESEARCH

This invention was made with Government support under Contract Number DAAJ09-91-C-A004 awarded by DOD/Army. The government has certain rights in this invention.

FIELD OF INVENTION

The present invention relates generally to structural members and more particularly to a strong yet lightweight hollow structural member and a method for its formation.

BACKGROUND OF THE INVENTION

In the design and fabrication of the various types of structural members that are employed in the aerospace industry, it is frequently desirable to minimize the weight of the device by incorporating a hollow chamber into the structural member. One drawback associated with this approach is that the tubular or extruded components that are typically utilized in the fabrication of light weight structural members are difficult to mechanically fasten to other structures or devices as the clamping force that is generated by the mechanical fastener is often of sufficient magnitude to crush the tubular or extruded component.

One solution that has been proposed for resisting the tendency for the mechanical fastener to crush the tubular or extruded component is the use of metallic support structures or potting compounds to facilitate the transmission of load across the tubular or extruded component through a path that has sufficient strength and cross-sectional area to prevent the clamping force from crushing the tubular or extruded component. The drawbacks associated with both conventionally-installed metallic support structures and potting compounds are similar in that their placement within the tubular or extruded component requires that the tubular or extruded component be fabricated in several pieces to permit the support structure or potting compound to be introduced and accurately positioned within the hollow interior.

Accordingly, there remains a need in the art for a structural member and a method for its construction wherein one or more support structures are accurately positioned and secured within the hollow interior of a tubular or extruded component without the use of mechanical fasteners.

SUMMARY OF THE INVENTION

In one preferred form, the present invention provides a reinforced structural member having a tubular member and a support structure. The tubular member has a sidewall that defines a hollow interior portion. The support structure is formed from a composite material and bonded to the sidewall in at least two predetermined locations. The support structure is positioned within the tubular member and configured to transmit force between the predetermined locations so as to prevent the tubular member from being crushed in response to the application of a force of a predetermined magnitude to the tubular member.

In another preferred form, the present invention provides a method for fabricating a structural member. The method includes the steps of: providing a tubular member having a sidewall that defines a hollow interior portion; providing a support insert formed from a composite material, the support insert being configured to fit within the hollow interior and contact the sidewall in at least two predetermined locations; positioning the support insert within the hollow interior at a predetermined location; and bonding the support insert to the tubular member such that the support insert is operable for transmitting a load between the predetermined locations.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

Figure 1:
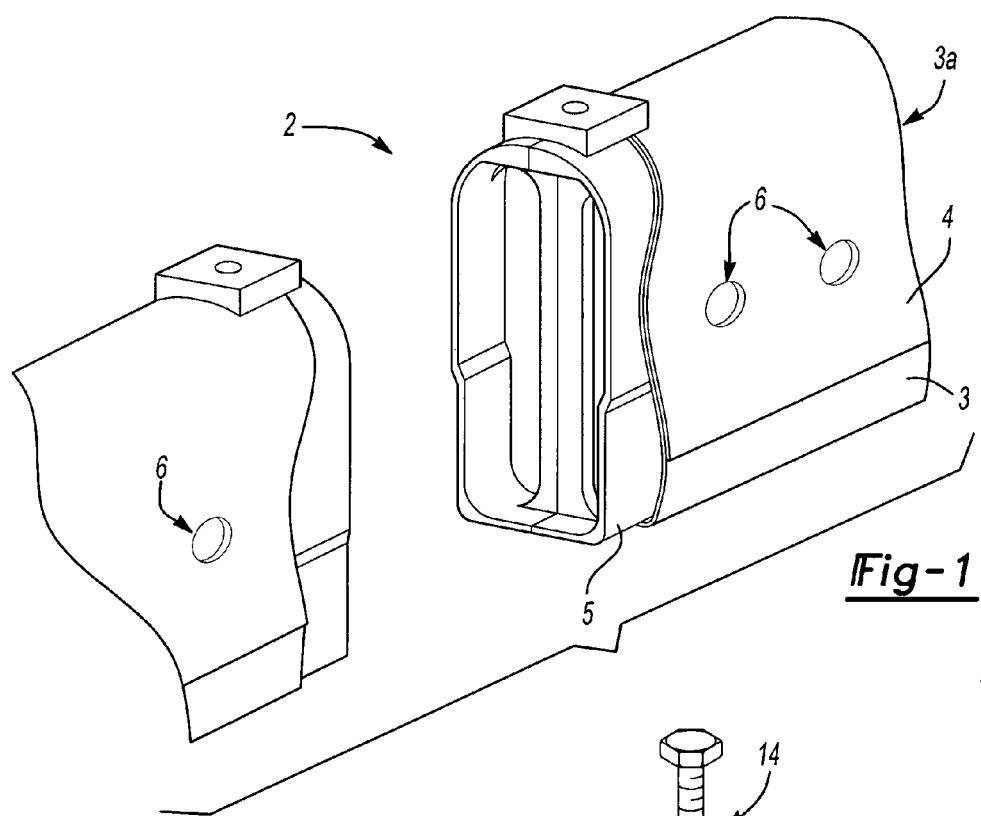
FIG. 1 is a structural member constructed in accordance alternative embodiment of the present invention.

With reference to FIG. 1 of the drawings, a reinforced structural member constructed in accordance with the teachings of the present invention is generally indicated by reference numeral 10. In the particular example provided, the structural member 10 is a helicopter transmission support strut that is secured to a transmission housing 12 via a plurality of conventional mechanical fasteners, such as a threaded bolt 14 and nut 16. Those skilled in the art will understand that the particular embodiment illustrated is merely exemplary and that the teachings of the present invention have applicability to other aerospace and non-aerospace applications.

As illustrated, the structural member 2 includes a first shell member 3, a second shell member 4, a plurality of support structures 5 and a plurality of mechanical fasteners 6, which are typically rivets. In fabricating the structural member 2, the support structures 5 are positioned within an internal cavity 3a formed in the first shell member 3 and fastened thereto with several of the mechanical fasteners 6. The second shell member 4 is then positioned over the first shell member 3, thereby encapsulating the support structures 5 within the hollow cavity defined by the first and second shell members 3 and 4. The remaining mechanical fasteners 6 are then employed to fixedly couple the second shell member 4 to the first shell member 3. The degree of overlap between the first and second shell members 3 and 4 that is necessary to permit these two components to be coupled together, as well as the use of mechanical fasteners 6 to both position the support structures 5 and fasten the first and second shell members 3 and 4 together, adds considerable weight to the structural member 2.

The structural member 10 is illustrated to include a tubular member 20 and at least one support structure 22. The tubular member 20 has a sidewall 30 that defines a hollow interior portion 32. The tubular member 20 is preferably unitarily formed so as to minimize the weight of the structural member 10 and may be a conventionally formed tubular or extruded component. A plurality of through-holes or apertures 34 are formed through the sidewall 30 to receive the bolts 14.

Figure 2:
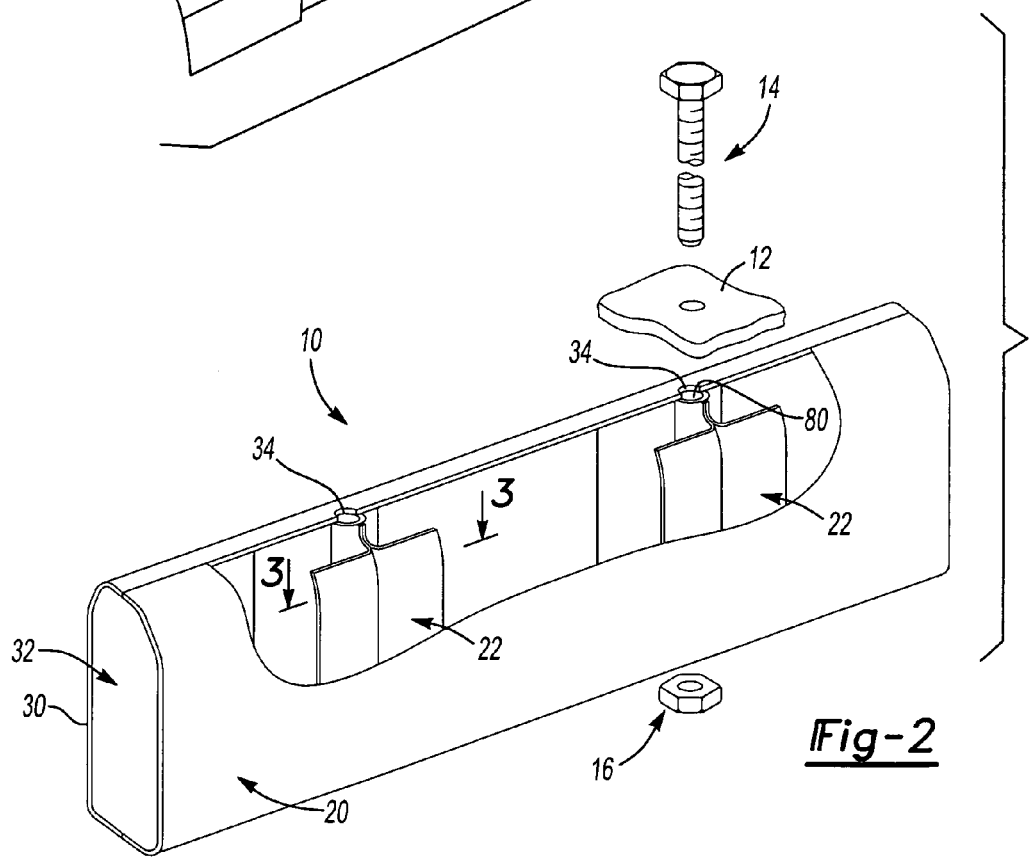
FIG. 2 is a partial sectional view of a structural member constructed in accordance with the teachings of the present invention.
Figure 3:
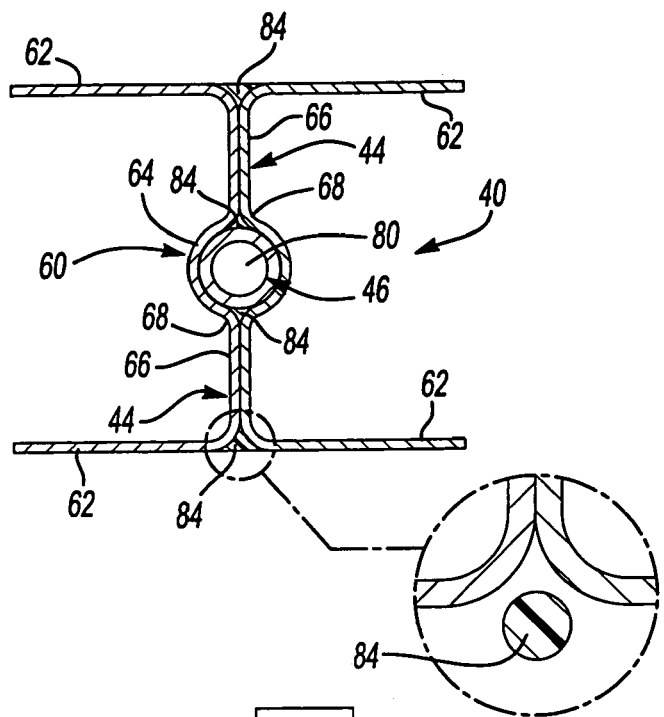
FIG. 3 is an cross-sectional view of a portion of the structural member taken along the line 3—3 of FIG. 2 and illustrating the construction of the support structures.

With additional reference to FIGS. 2 and 3, the support structure 22 is formed from a support insert 40 which is bonded to and cured within the hollow interior portion 32 of the tubular member 20 (i.e., the support structure 22 is a support insert 40 which has been impregnated with an epoxy resin and cured). Those skilled in the art will understand that the particular configuration of the support structure 22 will vary depending upon various design criteria, including the magnitude and types of loads that are to be transmitted through the tubular member 20 and the cross-sectional shape of the hollow interior portion 32. Accordingly, those skilled in the art will understand that the particular configuration illustrated is merely exemplary and not intended in any way to limit the scope of the present invention.

With specific reference to FIGS. 2 and 3, the construction of the support structure 22 and support insert 40 is illustrated in greater detail. In the particular example provided, the support insert 40 includes a pair of rib members 44 and a tube member 46. The rib members 44 and the tube member 46 are formed from woven or unidirectional carbon fiber, but may be formed from any suitable composite material including fiberglass, carbon graphite or polymer or poly-amide materials, such as Kevlar®. In the particular example provided, the tube member 46 is formed from 10 plies of an AS4 or T300 woven carbon fiber, with the plies having an orientation of $[0]_{10}$ and the rib members 44 are formed from 6 plies of an AS4 or T300 woven carbon fiber, with their plies having an orientation of $[45/0/45]_S$. The thickness of the plies that form the tube member 46 is about 0.08 inch, while the thickness of the plies that form each of the rib members 44 is about 0.05 inch.

Each of the rib members 44 is initially formed as a laid-up sheet member 50 which is thereafter tackified and placed in a forming die 52. The forming die 52 is employed to simultaneously shape and heat the sheet member 50 to thereby produce a rib member 44 having sufficient strength to facilitate the fabrication of the support insert 40 and the structural member 10. In the particular embodiment illustrated, each rib member 44 is illustrated to include a body portion 60 and a pair of end portions 62. The body portion 60 is shown to include an arcuate center portion 64 that is configured to mate with a portion of the tube member 46. Each end 66 of the body portion 60 is fixedly coupled to the arcuate center portion 64 at a first end and to one of the end portions 62 at a second end. The intersections between the ends 66 and both the arcuate center portion 64 and the end portions 62 are illustrated to include a pocket radii 68 which is employed to inhibit the formation of stress risers in the support structure 22. Each end portion 62 has a generally vertical central portion 70 and a pair of tips 72. Each tip 72 is shown to extend away from the central portion 70 and inwardly toward the body portion 60 in a manner which permits the end portions 62 to conform to the sidewall 30 of the tubular member 20.

Unlike the rib members 44, the tube member 46 is impregnated with an epoxy and fully cured so as to prevent it from crushing during the subsequent stages of the formation of the structural member 10. The tube member 46 includes a through-hole 80 that is sized to receive the bolt 14. The tube member 46 may simply be bonded to the arcuate center portions 64 of the rib members 44 to form the support insert 40. It is preferred, however, that several pieces of a uni-directional roving material 84 be bonded to one of the rib members 44 to eliminate the presence of voids that would otherwise occur as a result of the use of pocket radii 68 in the rib members 44 and the back-to-back placement of the rib members 44.

The support insert 40 is inserted into the hollow interior portion 32 of the tubular member 20 and a suitable resin transfer molding process is employed to inject resin into the rib members 44. The resin is then cured to form a support structure 22 which is securely bonded to the tubular member 20 in a manner that permits the clamping force that is generated by the bolt 14 to be transmitted between predetermined locations in the tubular member 20 without substantially deforming the hollow interior portion 32. Those skilled in the art will readily understand that construction of support structure 22 in this manner net match molds the outer mold line and the inner mold line surfaces in a single curing operation.

Figure 4:
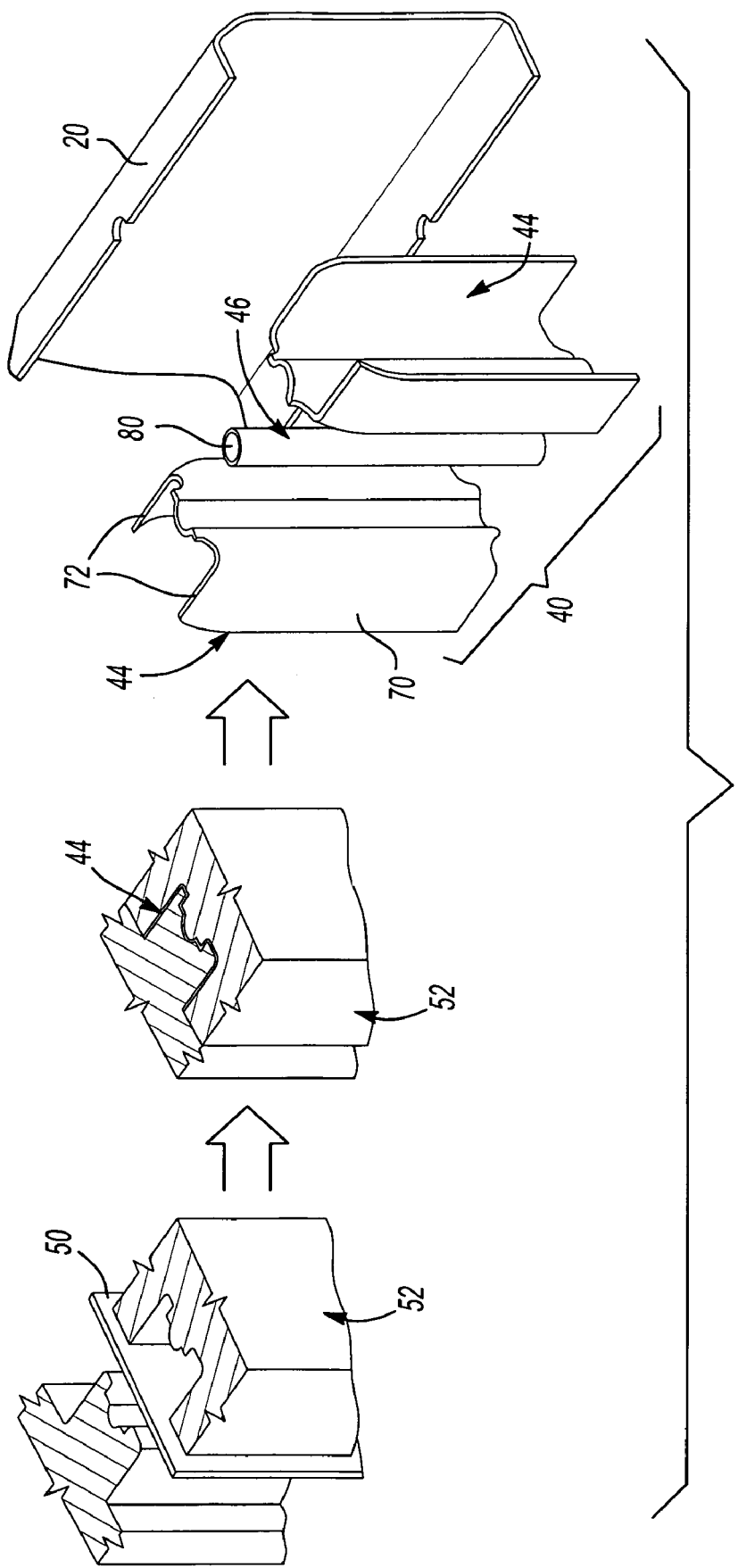
FIG. 4 is an exploded perspective view of a portion of the structural member illustration the construction of the support structure.

With reference to FIGS. 1 and 4, the tooling for the fabrication of the structural member 10 is schematically illustrated. The tooling is shown to include a pair of end mandrels 100, a resin injection system 102 and a vacuum source 104 and a mold 105. A spacer member 106 that is formed from a soluble material or fugitive material, such as a salt known to one skilled in the art, is employed to precisely space the support inserts 40 apart. The spacer member 106 and the support inserts 40 are positioned within the hollow interior portion 32 of the tubular member 20 such that the aperture 80 of each of the tube members 46 is aligned using a removable tooling pin (not shown) to a corresponding one of the through-holes 34 that are formed through the sidewall 30 of the tubular member 20.

The end mandrels 100 are then inserted to the hollow interior portion 32 of the tubular member 20 and fixedly coupled to the tubular member 20. The end mandrels 100 contact an associated one of the support inserts 40 and collectively cause the spacer member 106 to abut both of the support inserts 40. The assembly (i.e., tubular member 20 with the end mandrels 100) are placed between the mold halves 105a that form the mold 105 such that the mold halves 105a engage the end mandrels 100.

The vacuum source 104 is next coupled to the tubular member 20 and any air that is trapped within the hollow interior portion 32 between the end mandrels 100 is removed. The resin injection system 102 is thereafter employed to inject a molten epoxy resin into the support inserts 40. The particular epoxy resin employed in this example is a PR500 one-part epoxy manufactured by the Minnesota Mining and Manufacturing Company. Once injected, the epoxy resin is then cured under a set of predetermined conditions, permitting the outer mold line (OML) and inner mold line (IML) of the support structure 22 to be formed by net match molding and cured in a single operation. The predetermined conditions may include the heating of the epoxy to a predetermined temperature and/or exposing the epoxy to a predetermined level of hydrostatic pressure. In the example provided, the predetermined conditions included the heating of the epoxy to a temperature of about 350° F. and the application of about 80 p.s.i. to about 100 p.s.i. of hydrostatic pressure to the epoxy for a period of about 2 hours. It should be noted that the use of the end mandrels 100, the spacer member 106 and the tubular member 20 permits all of the outer surfaces of the support structure 22 to be formed to a predetermined thickness to ensure the structural integrity of the support structure 22.

Figure 5:
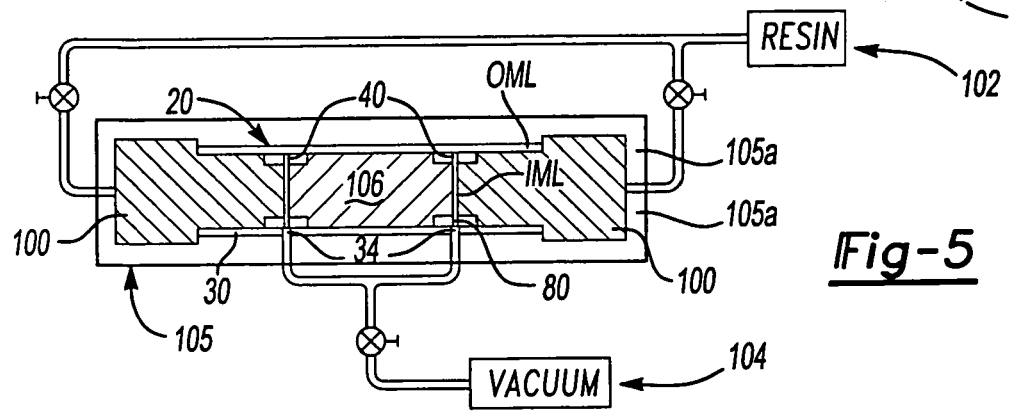
FIG. 5 is a schematic illustration of the tooling employed in the fabrication of the structural member of FIG. 2.

After the resin has cured, the tubular member 20 is removed from the mold 105. Thereafter, the end mandrels 100, resin transfer system 102 and vacuum source 104 are removed from the tubular member 20 and the structural member 10 is immersed in a suitable liquid to dissolve the spacer member 106. Alternatively, as shown in FIG. 5, the spacer member 106 may be fabricated from a lightweight structural material, such as foam, to eliminate the need to remove the spacer member 106 from the pocket between the support structures 22. In the embodiment illustrated, the foam is Rohacell Foam that has been machined to fit within the hollow interior portion 32 and abut the support inserts 40.

Figure 6:
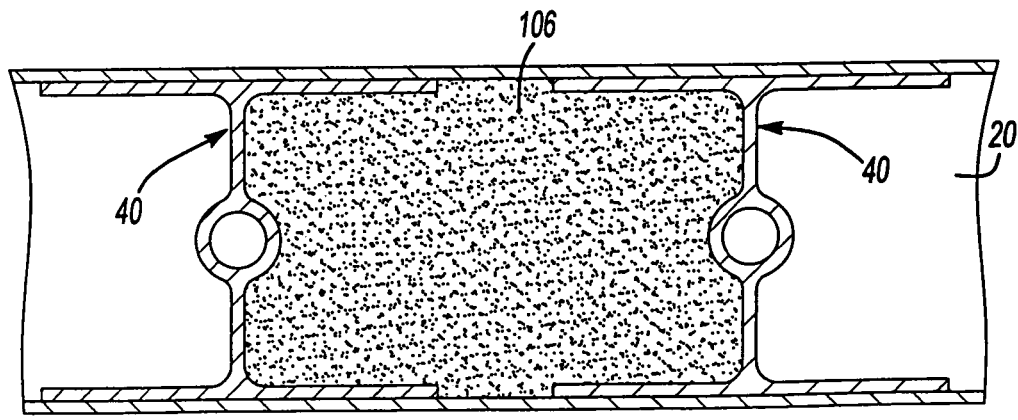
FIG. 6 is a sectional view of a structural member constructed in accordance with an alternate embodiment of the present invention taken along the longitudinal axis of the structural member.

With reference now to FIG. 6, a structural member constructed in accordance alternative embodiment of the present invention is shown. The structural member 2 includes a first shell member 3, a second shell member 4, a plurality of support structures 5 and a plurality of mechanical fasteners 6, which are typically rivets. In fabricating the structural member 2, the support structures 5 are positioned within an internal cavity 3a formed in the first shell member 3 and fastened thereto with several of the mechanical fasteners 6. The second shell member 4 is then positioned over the first shell member 3, thereby encapsulating the support structures 5 within the hollow cavity defined by the first and second shell members 3 and 4. The remaining mechanical fasteners 6 are then employed to fixedly couple the second shell member 4 to the first shell member 3.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiments illustrated by the drawings and described in the specification as the best mode presently contemplated for carrying out this invention, but that the invention will include any embodiments falling within the foregoing description and the appended claims.

What is claimed is:

1. A method for fabricating a structural member, the method comprising the steps of:
   providing a tubular member having a sidewall that defines a hollow interior portion;
   providing at least two support inserts formed from a precured composite material, the at least two support inserts being configured to fit within the hollow interior and contact the sidewall in at least two predetermined locations;
   providing at least one spacer member;
   positioning the at least two support members and the at least one spacer member within the hollow interior at a predetermined location, wherein the at least one spacer member is disposed between and abutting a pair of support inserts;
   bonding the at least two support inserts directly to the tubular member such that the at least two support inserts are operable for transmitting a load between predetermined locations by:
   introducing an epoxy resin to the support insert; and
   curing the epoxy resin under a predetermined set of conditions; and
   removing the at least one spacer member after the step of bonding the at least two support inserts to the tubular member.

2. The method of claim 1, wherein the set of predetermined conditions includes heating the epoxy resin to a predetermined temperature.

3. The method of claim 2, wherein the predetermined temperature is about 350° F.

4. The method of claim 1, wherein the set of predetermined conditions further
   including:
   applying a predetermined level of hydrostatic pressure to the epoxy resin.

5. The method of claim 4, wherein the predetermined level of hydrostatic pressure is about 80 p.s.i. to about 100 p.s.i.

6. The method of claim 1, wherein the spacer member is formed from a fugitive material.

7. The method of claim 1, wherein the spacer member is formed from a structural material.

8. The method of claim 1, wherein the step of providing the support insert includes the steps of:
   providing a sheet member formed from the composite material;
   tackifing the sheet member;
   providing a forming die; and
   introducing the sheet member in the die to form the sheet member and generate at least a portion of the support insert.

9. The method of claim 1, further comprising:
   curing the tubular member from a composite.

10. The method of claim 8, wherein the step of providing the support insert further includes:
    the step of bonding a uni-directional fiber within a void located between the precured composite member and the formed sheet member.

11. A reinforced structural member comprising:
    a substantially hollow member having a sidewall that defines a hollow interior portion;
    an internal support structure to provide a selected structural integrity to said hollow member, said support structure including;
       a tube member having a generally hollow interior; and
       a pair of rib structures, each of the rib structures conforming to at least a portion of the tube member, each of the rib structures being bonded to the other one of the rib structures and the tube member,
    said internal support structure being formed from a precured composite material and bonded to the sidewall in at least two predetermined locations, the support structure being positioned within the hollow member and configured to transmit force between the predetermined locations so as to prevent the hollow member from being crushed in response to the application of a force of a predetermined magnitude to the hollow member.

12. The reinforced structural member of claim 11, wherein the support structure includes a plurality of unidirectional fibers, each of the uni-directional fibers being bonded to at least one of the rib structures to fill a void formed between a respective one of the rib structures and at least one of the other one of the rib structures and the tube member.

13. The reinforced structural member of claim 11, wherein the precured composite material is selected from a group of composite materials consisting of fiberglass, carbon fibers and a polymer.

14. The reinforced structural member of claim 11, wherein:
said sidewall defines a first aperture and a second aperture;
said tube member extends between said first aperture and said second aperture; and
structural integrity of said hollow member is maintained.

15. The reinforced structural member of claim 11, wherein the rib structures are generally C-shaped.

16. A method for fabricating a structural member, the method comprising the steps of:
forming an extended hollow member having a sidewall that defines an interior portion;
forming a support structure including:
forming a support member by curing a laminate material into a shape and size operable to be received within the interior portion;
providing a tube member; and
operably connecting a plurality of said support members about said tube member;
bonding said support structure to said sidewall within said interior portion;
positioning said support structure within the interior portion of said extended hollow member; and
injecting a resin into said extended hollow member and said support structure,
said resin being curable to substantially net match the geometry of the interior portion of the sidewall.

17. The method of claim 16, wherein forming an extended hollow member includes forming a sidewall of a material selected from at least one of a metal, a fiber, a laminate and combinations thereof.

18. The method of claim 16, wherein forming a support structure further includes:
substantially filling a gap between said plurality of support members by including a uni-directional roving material near a joint of at least a first of said plurality of support members and a second of said plurality of support members.

19. The method of claim 16, wherein:
providing a tube member includes providing a member extending along a selected axis substantially defining a bore along said axis; and
said tube members operable with said plurality of support members to define the support structure to include a passage therethrough.

20. The method of claim 16, wherein:
forming an extended hollow member includes providing a first aperture and a second aperture in said sidewall; and
bonding said support structure to said sidewall includes substantially aligning the axis of the tube member between said first aperture and said second aperture.

21. The method of claim 16, wherein:
forming a support member includes providing a laminate material including at least one of a fiberglass, a carbon graphite, a polymer, and combinations thereof; and
each of the layers of the material are laminated together to form the support member of a selected geometry.

22. A reinforced structural member comprising:
a tubular member having a sidewall that defines a hollow interior portion;
a support structure formed from a composite material and bonded to the sidewall in at least two predetermined locations, the support structure being positioned within the tubular member and configured to transmit force between the predetermined locations so as to prevent the tubular member from being crushed in response to the application of a force of a predetermined magnitude to the tubular member,
the support structure including:
a uni-directional fiber bonded within a void located between the composite member and the tubular member;
a tube member having a generally hollow interior; and
a pair of rib structures, each of the rib structures conforming to at least a portion of the tube member, each of the rib structures being bonded to the other one of the rib structures and the tube member.

23. The reinforced structural member of claim 22, wherein the support structure includes a plurality of uni-directional fibers, each of the uni-directional fibers being bonded to at least one of the rib structures to fill a void formed between a respective one of the rib structures and at least one of the other one of the rib structures and the tube member.

24. The reinforced structural member of claim 22, wherein the precured composite material is selected from a group of composite materials consisting of fiberglass, carbon fibers and a polymer.

25. The reinforced structural member of claim 22, wherein:
said sidewall defines a first aperture and a second aperture;
said bore operably interconnects said first aperture and said second aperture; and
structural integrity of said hollow member is maintained.

26. The reinforced structural member of claim 22, wherein the rib structures are generally C-shaped.

* * * * *